(12) United States Patent
Chen et al.

(10) Patent No.: US 11,870,632 B2
(45) Date of Patent: Jan. 9, 2024

(54) METHOD, DEVICE AND APPARATUS FOR TIME DIVISION DUPLEX SYNCHRONIZATION FOR DISTRIBUTED ANTENNA SYSTEM, AND MEDIUM

(71) Applicant: SUNWAVE COMMUNICATIONS CO., LTD., Hangzhou (CN)

(72) Inventors: Qingsong Chen, Hangzhou (CN); Xin Wang, Hangzhou (CN); Ailin Ren, Hangzhou (CN); Jianyang Mao, Hangzhou (CN); Rulong Chu, Hangzhou (CN); Wenquan Wu, Hangzhou (CN)

(73) Assignee: SUNWAVE COMMUNICATIONS CO., LTD., Hangzhou (CN)

( * ) Notice: Subject to any disclaimer, the term of this patent is extended or adjusted under 35 U.S.C. 154(b) by 116 days.

(21) Appl. No.: 17/614,561

(22) PCT Filed: Aug. 3, 2020

(86) PCT No.: PCT/CN2020/106601
§ 371 (c)(1),
(2) Date: Nov. 29, 2021

(87) PCT Pub. No.: WO2021/023157
PCT Pub. Date: Feb. 11, 2021

(65) Prior Publication Data
US 2022/0231896 A1 Jul. 21, 2022

(30) Foreign Application Priority Data
Aug. 6, 2019 (CN) .......................... 201910722762.5

(51) Int. Cl.
*H04L 27/00* (2006.01)
*H04L 27/26* (2006.01)
(Continued)

(52) U.S. Cl.
CPC ........ *H04L 27/2656* (2013.01); *H04L 5/1469* (2013.01); *H04L 25/0224* (2013.01); *H04W 56/001* (2013.01)

(58) Field of Classification Search
None
See application file for complete search history.

(56) References Cited

U.S. PATENT DOCUMENTS 11,115,943 B2 * 9/2021 Ko ............................ H04L 5/10
2018/0198659 A1 7/2018 Ko et al.
(Continued)

FOREIGN PATENT DOCUMENTS

CN 107197486 A 9/2017
CN 107404754 A 11/2017
(Continued)

OTHER PUBLICATIONS

"Remaining details on NR Random Access", R1-1811099, Nokia, 3GPP TSG-RAN WG1#94bis, Oct. 12, 2018, pp. 1-8.
(Continued)

*Primary Examiner* — Gerald A Smarth

(57) ABSTRACT

The present disclosure relates to a method, device, and apparatus for time division duplex synchronization for a distributed antenna system, and a medium. The method comprises: decoding a SS/PBCH block from a time division duplex cell, and obtaining an index of the SS/PBCH block; determining, according to the index of the SS/PBCH block, a starting position of a radio frame in which the SS/PBCH block is located; and performing time division duplex synchronization according to the starting position of the radio frame and a preset uplink and downlink configuration of the radio frame.

11 Claims, 3 Drawing Sheets

---

Decoding a SS/PBCH block from a time division duplex cell, and obtaining an index of the SS/PBCH block — S101

Determining, according to the index of the SS/PBCH block, a starting position of a radio frame in which the SS/PBCH block is located — S102

Performing time division duplex synchronization according to the starting position of the radio frame and a preset uplink and downlink configuration of the radio frame — S103

(51) Int. Cl.
  *H04L 5/14* (2006.01)
  *H04L 25/02* (2006.01)
  *H04W 56/00* (2009.01)

(56) References Cited

U.S. PATENT DOCUMENTS

| | | | |
|---|---|---|---|
| 2018/0248642 A1 | 8/2018 | Si et al. | |
| 2018/0368181 A1* | 12/2018 | Lee | ............ H04W 24/08 |
| 2019/0007124 A1 | 1/2019 | Seo et al. | |
| 2019/0215790 A1 | 7/2019 | Kim et al. | |
| 2021/0144601 A1* | 5/2021 | Kazmi | ............ H04W 36/0088 |

FOREIGN PATENT DOCUMENTS

| | | | |
|---|---|---|---|
| CN | 110035028 A | 7/2019 | |
| CN | 110519838 A | 11/2019 | |
| EP | 3402100 A1 | 11/2018 | |
| EP | 3457792 A1 | 3/2019 | |
| KR | 20190044691 A | 4/2019 | |
| WO | WO2014071579 A1 | 5/2014 | |
| WO | WO201808219 A1 | 11/2018 | |
| WO | WO-2019003091 A1 * | 1/2019 | ............ G02B 13/02 |
| WO | WO2019098768 A1 | 5/2019 | |

OTHER PUBLICATIONS

International Search Report of PCT/CN2020/106601.
First Examination Opinion of 201910722762.5.
The extended European search report of EP20849624.0.

* cited by examiner

METHOD, DEVICE AND APPARATUS FOR TIME DIVISION DUPLEX SYNCHRONIZATION FOR DISTRIBUTED ANTENNA SYSTEM, AND MEDIUM

CROSS-REFERENCE TO RELATED APPLICATIONS

This application is a National Stage application of International Application No. PCT/CN2020/106601 filed on Aug. 3, 2020, which claims all benefits accruing from China Patent Application No. 201910722762.5, filed on Aug. 6, 2019, titled "METHOD, DEVICE AND APPARATUS FOR TIME DIVISION DUPLEX SYNCHRONIZATION FOR DISTRIBUTED ANTENNA SYSTEM, AND DEDIUM" in the China National Intellectual Property Administration, both of which are hereby incorporated by reference.

TECHNICAL FIELD

The present disclosure generally relates to the technical field of communication, and in particular, to a method, a device, and an apparatus for time division duplex synchronization for a distributed antenna system, and a medium.

BACKGROUND

With the advent of 5G era, mobile communication data flow will show explosive growth, which puts forward higher requirements for wireless network coverage, especially for Radio Access Network (RAN). Distributed Antenna System (DAS) is an important part of RAN. Distributed Antenna System is distributed inside buildings to solve a problem of signal coverage inside buildings. A convenient and fast deployment mode of Distributed Antenna System is conducive to a rapid and flexible construction of wireless network to meet user needs.

5G NR (New Radio) adopts a frame structure of Time Division Duplexing (TDD) in most frequency bands, so the DAS must obtain accurate time division duplex synchronization for uplink and downlink switching of transceivers. A traditional centralized antenna system adopts Global Positioning System (GPS) for time division duplex synchronization. Different from the centralized antenna system deployed outdoors, the Distributed Antenna System often receives no GPS signal inside the building or in the basement, so it is difficult to directly perform time division duplex synchronization even if a GPS receiver is configured in the Distributed Antenna System. Installing a GPS antenna outdoors can solve a problem of GPS signal coverage, but it will increase an engineering complexity of deploying the Distributed Antenna System.

The Distributed Antenna System performing time division duplex synchronization by means of a GPS in related technologies, leads to the increase in deployment cost of the Distributed Antenna System, and no solution has been proposed.

SUMMARY

According to various embodiments of the present disclosure, a method for time division duplex synchronization for a distributed antenna system is provided. The method includes: decoding a SS/PBCH block from a time division duplex cell, and obtaining an index of the SS/PBCH block; determining, according to the index of the SS/PBCH block, a starting position of a radio frame in which the SS/PBCH block is located, and performing time division duplex synchronization according to the starting position of the radio frame and a preset uplink and downlink configuration of the radio frame.

In an embodiment of the present disclosure, the decoding the SS/PBCH block from the time division duplex cell includes: decoding the SS/PBCH block through a cell search and a downlink synchronization process.

In an embodiment of the present disclosure, the decoding the SS/PBCH block through the cell search and the downlink synchronization process includes: selecting a target cell by searching a PSS signal; receiving, upon searching for a PSS signal carrying an intra-group identification $N_{ID}^{(2)}$ of the target cell, the SS/PBCH block from the target cell; decoding a SSS signal in the SS/PBCH block, and obtaining a group identification $N_{ID}^{(1)}$ of the target cell; calculating a cell identification $N_{ID}^{Cell}$ of the target cell according to the intra-group identification $N_{ID}^{(2)}$ and the group identification NID(1); decoding a PBCH DM-RS signal in the SS/PBCH block according to the cell identification $N_{ID}^{Cell}$; and determining the index of the SS/PBCH block according to the decoded PBCH DM-RS signal.

In an embodiment of the present disclosure, the determining the index of the SS/PBCH block according to the decoded PBCH DM-RS signal includes: determining information of three lowest bits of the index of the SS/PBCH block according to the decoded PBCH DM-RS signal; and channel estimating by using the PBCH DM-RS signal, decoding a PBCH and obtaining information in a main information block, and the information in the master information block including information of three highest bits of the index of the SS/PBCH block.

In an embodiment of the present disclosure, the determining, according to the index of the SS/PBCH block, the starting position of the radio frame in which the SS/PBCH block is located includes: determining a mode of the SS/PBCH block according to a subcarrier interval of the SS/PBCH block and a frequency band of the SS/PBCH block, and determining, according to the index of the SS/PBCH block and the mode of the SS/PBCH block, the starting position of the radio frame in which the SS/PBCH block is located.

In an embodiment of the present disclosure, the determining, according to the index of the SS/PBCH block and the mode of the SS/PBCH block, the starting position of the radio frame in which the SS/PBCH block is located includes: determining, according to the index of the SS/PBCH block and the mode of the SS/PBCH block, a position of a first OFDM symbol of the SS/PBCH block in the radio frame, and locating the starting position of the radio frame according to the position of the first OFDM symbol of the SS/PBCH block in the radio frame.

In an embodiment of the present disclosure, the subcarrier interval of the SS/PBCH block includes one of the following: 15 kHz, 30 kHz, 120 kHz and 240 kHz.

In an embodiment of the present disclosure, the performing time division duplex synchronization according to the starting position of the radio frame and the preset uplink and downlink configuration of the radio frame includes: performing switching between uplink and downlink, according to the preset uplink and downlink configuration of the radio frame, with the starting position of the radio frame as a starting time.

According to various embodiments of the present disclosure, a device for time division duplex synchronization for a distributed antenna system is further provided. The device includes: a decoding module configured for decoding a SS/PBCH block from a time division duplex cell, and obtaining an index of the SS/PBCH block; a determining module configured for determining, according to the index of the SS/PBCH block, a starting position of a radio frame in which the SS/PBCH block is located; and a time division duplex synchronization module configured for performing time division duplex synchronization according to the starting position of the radio frame and a preset uplink and downlink configuration of the radio frame.

According to various embodiments of the present disclosure, an apparatus for time division duplex synchronization for a distributed antenna system is further provided. The apparatus includes: at least a processor, at least a memory and computer program instructions stored in the memory. The computer program instructions are executed by the processor to implement the above method.

According to various embodiments of the present disclosure, a computer-readable storage medium is further provided. The computer-readable storage medium has stored computer program instructions, and the computer program instructions are executed by a processor to implement the above method.

BRIEF DESCRIPTION OF THE DRAWINGS

To describe and illustrate embodiments and/or examples of the present disclosure made public here better, reference may be made to one or more of the figures. The additional details or examples used to describe the figures should not be construed as limiting the scope of any of the present disclosure, the embodiments and/or examples currently described, and the best model of the present disclosure as currently understood.

DETAILED DESCRIPTION OF THE EMBODIMENTS

The present disclosure will be described clearly and completely below with reference to the drawings in the embodiments of the present disclosure. Obviously, the embodiments described are part of the present disclosure and not all embodiments. Based on the embodiments in the present disclosure, all other embodiments obtained by ordinary technical personnel in this field without making creative labor shall fall within the scope of protection of the present disclosure.

All contents of 3GPP TS 38.104 V15.6.0 (Public Date: June, 2019), 3GPP TS 38.211 V15.6.0 (Public Date: June, 2019) and 3GPP TS 38.213 V15.6.0 (Public Date: June, 2019) released by 3$^{rd}$ Generation Partnership Project (3GPP) are incorporated into this document by reference and form a part of the specification of the present disclosure.

Figure 1:
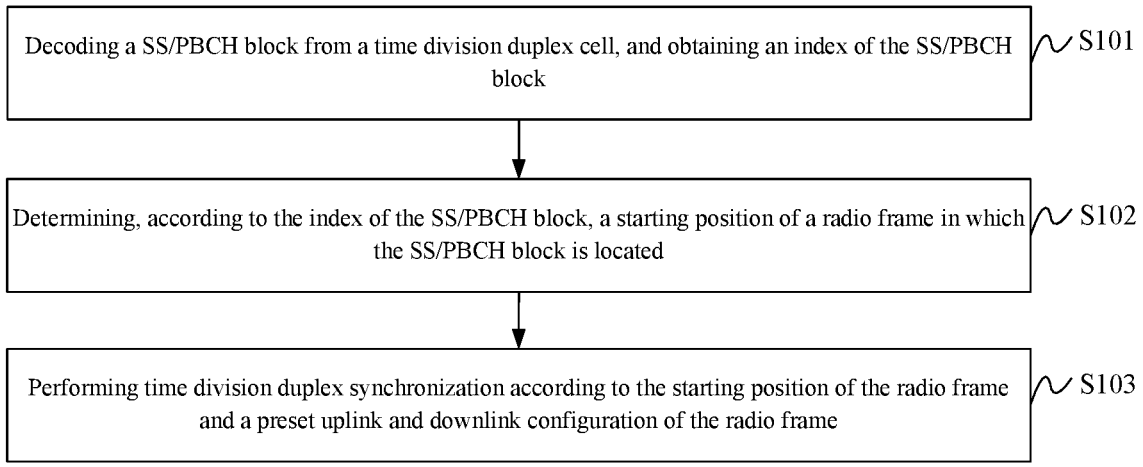
FIG. 1 is a flowchart diagram of a method for time division duplex synchronization for a distributed antenna system in an embodiment of the present disclosure.

In an embodiment, a method for time division duplex synchronization for a distributed antenna system is provided. FIG. 1 is a flowchart diagram of a method for time division duplex synchronization for a distributed antenna system in an embodiment of the present disclosure. As shown in FIG. 1, the flowchart includes the following steps: at step 101, decoding a SS/PBCH block from a time division duplex cell, and obtaining an index of the SS/PBCH block; at step 102, determining, according to the index of the SS/PBCH block, a starting position of a radio frame in which the SS/PBCH block is located; and at step 103, performing time division duplex synchronization according to the starting position of the radio frame and a preset uplink and downlink configuration of the radio frame.

A downlink synchronization between a User Equipment (UE) in 5th-Generation New Radio (5G NR) and a 5G base station (gNode B, gNB for short) is similar to Long Term Evolution (LTE), which is performed by searching for a Primary Synchronization signal (PSS)/a Secondary Synchronization Signal (SSS) and decoding Synchronization Signal Block (SSB). The main purpose is that the UE obtains time Division duplex synchronization and radio frame synchronization of Orthogonal Frequency Division Multiplexing (OFDM) symbol, also obtains Physical-layer Cell identity (PCI) and system messages etc.

Figure 2:
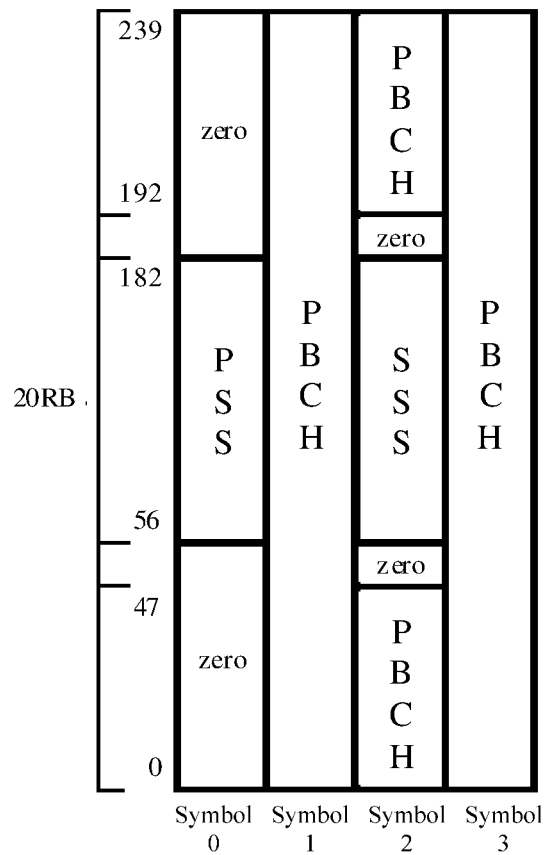
FIG. 2 is a schematic diagram of time-frequency resource allocation of a SS/PBCH block of in related technologies.

The SSB contains a Synchronization Signal (SS) and a Physical Broadcast Channel (PBCH). The Synchronization Signal and the PBCH have always been packaged together, thus the SSB is also known as a SS/PBCH block. FIG. 2 is a schematic diagram of time-frequency resource allocation of a SS/PBCH block of in related technologies. As shown in FIG. 2, according to a definition of 3GPP TS 38.211, the SS/PBCH block contains a Primary Synchronization Signal (PSS), a Secondary Synchronization Signal (SSS), a PBCH, and a Demodulation Reference Signal (DM-RS) of the PBCH. The SS/PBCH block occupies 4 OFDM symbols in the time domain and 240 subcarriers in the frequency domain.

The PSS occupies 127 subcarriers in the middle of the SS/PBCH block on the first OFDM symbol of the SS/PBCH block, and 56 subcarriers and 57 subcarriers on both sides do not transmit any signal respectively. This design enables a large frequency isolation between the PSS and other signals, which is convenient for the UE to distinguish the PSS from other signals. A PSS sequence has three values, which have a one-to-one mapping relationship with an identity $N_{ID}^{(2)} \in \{0,1,2\}$ in the Physical-layer Cell identity group.

The SSS occupies 127 subcarriers in the middle of the SS/PBCH block on the third OFDM symbol of the SS/PBCH block, and 8 subcarriers and 9 subcarriers on both sides do not transmit any signal respectively. This design not only makes full use of resources on the third OFDM symbol, but also facilitates the UE to distinguish the SSS from the PBCH. A SSS sequence has 336 values, which have a one-to-one mapping relationship with the Physical-layer Cell identity group $N_{ID}^{(1)} \in \{0, 1, \ldots, 355\}$.

The 5G NR has 336×3=1008 Physical-layer Cell identities (PCI), the PCI is calculated according to Formula (1): $N_{ID}^{Cell} = N_{ID}^{(1)} + N_{ID}^{(2)}$ (1).

The PBCH is on the 2nd to 4th OFDM symbols of the SS/PBCH block. There are 240 subcarriers on the 2nd and 4th OFDM symbols respectively, 96 subcarriers on the 3rd OFDM symbol, and the PBCH has 576 subcarriers in total. Master Information Block (MIB) messages are transmitted on the PBCH.

There are three DM-RS on each Resource Block (RB) of the PBCH, so the DM-RS has four frequency domain offsets. Setting different frequency domain offsets in the same frequency neighborhood is conducive to reducing pilot interference. The frequency domain offsets are calculated according to Formula (2): $v = N_{ID}^{cell} \mod 4$ (2).

A DM-RS sequence r(m) for the PBCH is defined by Formula (3):

$$r(m) = \frac{1}{\sqrt{2}}(1 - 2 \cdot c(2m)) + j\frac{1}{\sqrt{2}}(1 - 2 \times c(2m+1)) \quad (3)$$

DM-RS scrambles generator is initialized in each SS/PBCH block according to $N_{ID}^{cell}$, a number $n_{hf}$ of a half frame in which the PBCH is located and an index $i_{SSB}$ of the SS/PBCH block.

According to a definition of 3GPP, the DM-RS in the 5G NR changes with the Physical-layer Cell identity (PCI); the SS/PBCH block may appear several times in a radio frame, i.e., there may be multiple candidate positions of the SS/PBCH block in the radio frame (the position of the first OFDM symbol of the SS/PBCH block in the radio frame represents the candidate position of the SS/PBCH block, and each candidate position corresponds to a serial number). A DM-RS signal of the SS/PBCH block at each candidate position is different, and the DM-RS signal indicates the index of the SS/PBCH block. Therefore, the position of the SS/PBCH block in the radio frame can be obtained by decoding the SS/PBCH block, which is convenient for the downlink synchronization between the UE and the 5G base station.

According to a definition of 3GPP TS 38.213, unlike a fixed period of SSS/PSS and PBCH of the LTE, a period of the SS/PBCH block of the 5G NR is variable and can be configured as 5 ms, 10 ms, 20 ms, 40 ms, 80 ms and/or 160 ms. Within each period, the SS/PBCH block is transmitted only on a half frame (5 ms). According to different subcarrier intervals of the SS/PBCH block, time positions of a candidate SS/PBCH block can be divided into five modes: A, B, C, D and E. The structure of each mode is as follows:

At mode A: the subcarrier interval of the SS/PBCH block is 15 kHz, and a position indication of the first OFDM symbol of the candidate SS/PBCH block is {2, 8}+14×n. For the carrier frequency less than or equal to 3 GHz, n=0, 1, the SS/PBCH block is transmitted on a subframe 0 and a subframe 1 of a half frame, and there are 4 candidate positions ($L_{max}$=4). For carrier frequency greater than 3 GHz and less than or equal to 6 GHz, n=0, 1, 2, 3, the SS/PBCH block is transmitted on a subframe 0, a subframe 1, a subframe 2 and a subframe 3 of a half frame, and there are 8 candidate positions ($L_{max}$=8).

At mode B: the subcarrier interval of the SS/PBCH is 30 kHz, and the position indication of the first OFDM symbol of the candidate SS/PBCH block is {4, 8, 16, 20}+28×n. For the carrier frequency less than or equal to 3 GHz, n=0, the SS/PBCH block is transmitted on subframe 0 of a half frame, and there are 4 candidate positions ($L_{max}$=4). For the carrier frequency greater than 3 GHz and less than or equal to 6 GHz, n=0, 1, the SS/PBCH block is transmitted on a subframe 0 and a subframe 1 of a half frame, and there are 8 candidate positions ($L_{max}$=8).

At mode C: the subcarrier interval of the SS/PBCH is 30 kHz, and the position indicator of the first OFDM symbol of the candidate SS/PBCH block is {2, 8}+14×n. For the carrier frequency less than or equal to 3 GHz, n=0, 1, the SS/PBCH block is transmitted on a subframe 0 of a half frame, and there are 4 candidate positions ($L_{max}$=4). For the carrier frequency greater than 3 GHz and less than or equal to 6 GHz, n=0, 1, 2, 3, the SS/PBCH block is transmitted on a subframe 0 and a subframe 1 of a half frame, and there are 8 candidate positions ($L_{max}$=8).

At mode D: the subcarrier interval of the SS/PBCH is 120 kHz, and the position indicator of the first OFDM symbol of the candidate SS/PBCH block is {4, 8, 16, 20}+28×n. For the carrier frequency greater than 6 GHz, n=0, 1, 2, 3, 5, 6, 7, 8, 10, 11, 12, 13, 15, 16, 17, 18, the SS/PBCH block is transmitted on a subframe 0, a subframe 1, a subframe 2, a subframe 3, and a subframe 4 of a half frame, and there are 64 candidate positions ($L_{max}$=64).

At mode E: the subcarrier interval of the SS/PBCH is 240 kHz, and the position indicator of the first OFDM symbol of the candidate SS/PBCH block is {8, 12, 16, 20, 32, 36, 40, 44}+56×n. For the carrier frequency greater than 6 GHz, n=0, 1, 2, 3, 5, 6, 7, 8, the SS/PBCH block is transmitted on a subframe 0, a subframe 1, and a subframe 2 of a half frame, and there are 64 candidate positions ($L_{max}$=64).

When the subcarrier interval is 15 kHz, each radio frame includes 140 OFDM symbols. When the subcarrier interval is 30 kHz, each radio frame includes 280 OFDM symbols. When the subcarrier interval is 120 kHz, each radio frame includes 1120 OFDM symbols. When the subcarrier interval is 240 kHz, each radio frame includes 2240 OFDM symbols. Therefore, in either of the modes A to E above, the SS/PBCH block is always transmitted on the first half frame.

In table 5.4.3.3 of chapter 5 of 3GPP TS 38.104, a SS/PBCH block pattern (i.e., SS Block pattern) adopted by the SS/PBCH block with different frequency bands and different subcarrier intervals (SCS) is further defined. The frequency band of the SS/PBCH block is identified by the Global Synchronization Channel Number (GSCN). Therefore, according to the subcarrier interval of the SS/PBCH block and the frequency band of the SS/PBCH block, the mode of SS/PBCH block can be determined based on a definition of 3GPP TS 38.104. According to the index of the SS/PBCH block and the mode of the SS/PBCH block, a starting position of the radio frame where the SS/PBCH block is located can be determined based on the definition of 3GPP TS 38.213.

It can be seen that since the DM-RS of the SS/PBCH block sent by time division duplex cell indicates the position of the SS/PBCH block in the first half frame of the radio frame, the DAS may decode the SS/PBCH block to obtain the index of the SS/PBCH block through steps S101 to S103 above. According to the index of the SS/PBCH block, the DAS may determine which OFDM symbol of the first half frame of the radio frame the first OFDM symbol of the SS/PBCH block is located. In addition, according to the definition of 3GPP, a number of the OFDM symbols in each radio frame is determined with a certain subcarrier interval configuration, so the DAS can determine a starting time of subsequent radio frame after determining the position of the first OFDM symbol of the SS/PBCH block in the first half frame of the radio frame. After determining the starting time of the radio frame, uplink and downlink can be switched according to the preset uplink and downlink configuration of the radio frame, and the time division duplex synchronization can be realized. Relative to a distributed antenna system in related technologies that performs time division duplex synchronization through a GPS, the distributed antenna system that adopts the above steps to perform time division duplex synchronization does not need to add a GPS receiver. Therefore, a problem of increased deployment cost of a distributed antenna system caused by time division duplex synchronization of distributed antenna system through a GPS is solved, and the deployment cost of the distributed antenna system is reduced.

In an embodiment of the present disclosure, in the step 101, the SS/PBCH block is decoded through a cell search and a downlink synchronization process. According to the definition of 3GPP TS 38.211, the process of cell search and downlink synchronization is the process of the UE acquiring time and frequency synchronization with the cell and detecting the Physical-layer Cell identity. In the process, the SS/PBCH block will be decoded according to a standard process. However, the cell search and the downlink synchronization process defined in 3GPP TS 38.211 are limited to a synchronization of time and frequency between the UE and the cell. In the embodiment of the present disclosure, the distributed antenna system may decode the SS/PBCH block by performing the cell search and the downlink synchronization process.

Figure 3:
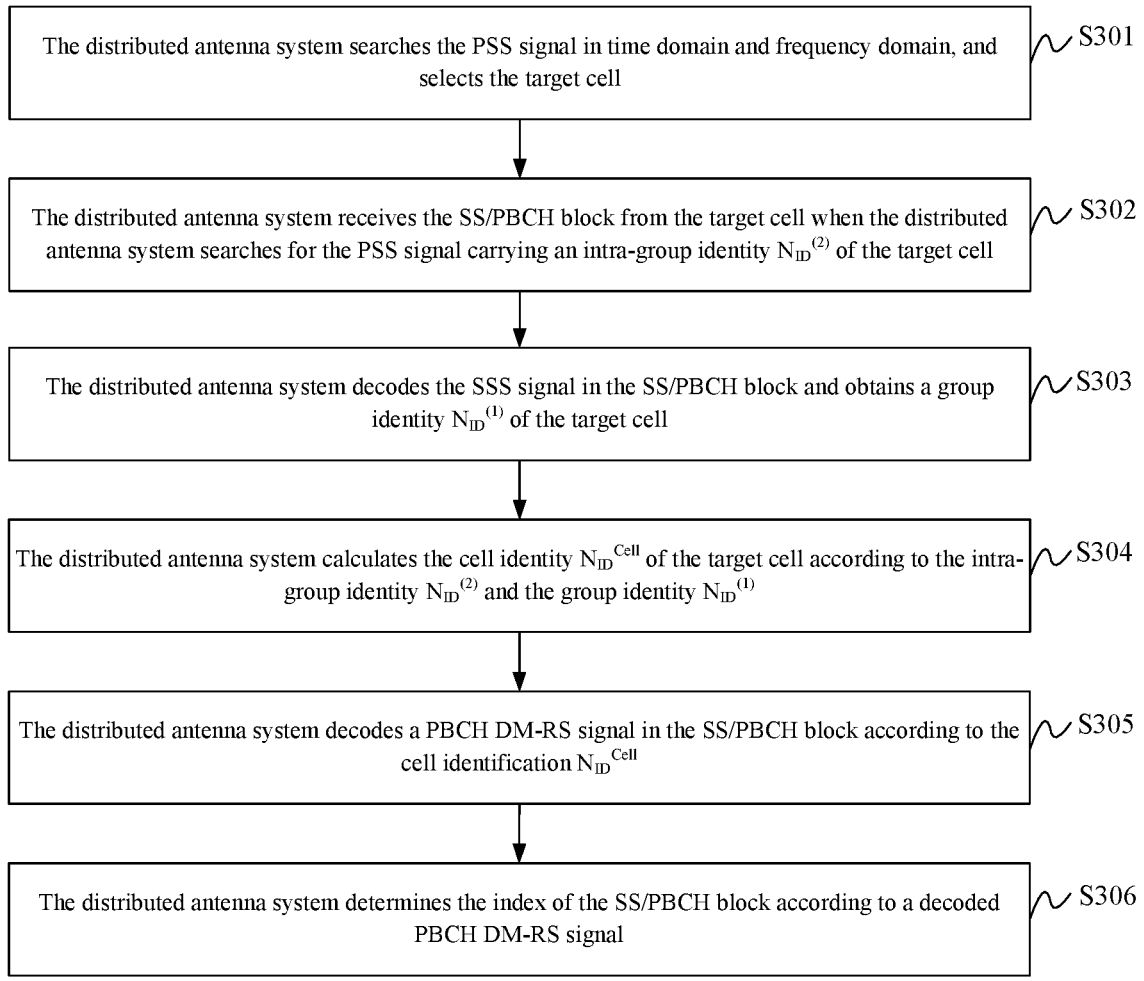
FIG. 3 is a flowchart diagram of a SS/PBCH block decoded by a distributed antenna system in an embodiment of the present disclosure.

FIG. 3 is a flowchart diagram of a SS/PBCH block decoded by a distributed antenna system in an embodiment of the present disclosure. As shown in FIG. 3, the SS/PBCH block decoding for distributed antenna system includes the following steps:

At step 301, the distributed antenna system searches the PSS signal in time domain and frequency domain, and selects the target cell. The target cell is a TDD system cell. In the process of the UE searching the cell, the target cell is a residential cell for the UE. In the embodiment, the target cell serves as a time division duplex synchronous source of the distributed antenna system, and the distributed antenna system is not the UE, so the distributed antenna system will not reside on the target cell.

Since 3GPP defines a possible position of the SS/PBCH block in the frequency domain and a repetition period (20 ms) in the time domain, it is necessary to conduct PSS search in the time domain and frequency domain. After searching for PSS, the distributed antenna system can determine a starting position of the OFDM symbol, realize a time synchronization of the OFDM symbol and a synchronization of the SS/PBCH block, and determine the $N_{ID}^{(2)}$ through blind decoding.

Figure 4:
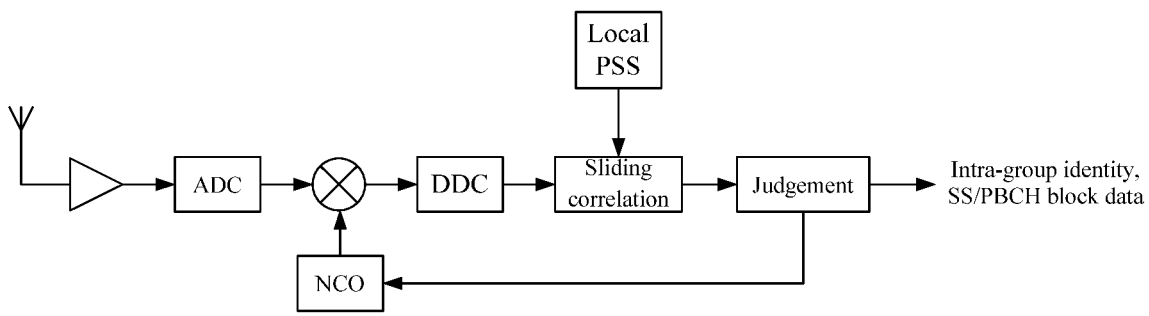
FIG. 4 is a flowchart diagram of PSS search by the distributed antenna system in an embodiment of the present disclosure.

FIG. 4 is a flowchart diagram of PSS search by the distributed antenna system in an embodiment of the present disclosure. As shown in FIG. 4, a signal received by the distributed antenna system is first amplified and converted into a digital signal by ADC. Because the SS/PBCH block occupies only 240 subcarriers, a digital down conversion (DDC) can be performed to reduce a sampling rate to save computational effort. A sliding correlation calculation is performed between the signal after the down conversion and a locally generated PSS signal, and a result of the correlation calculation are judged in 20 ms cycle: when a maximum correlation degree within 20 ms is greater than a predefined threshold, the PSS signal has been found and the calculation is stopped. Otherwise, a frequency of a Numerically Controlled Oscillator (NCO) is switched to search PSS again.

At step 302, the distributed antenna system receives the SS/PBCH block from the target cell when the distributed antenna system searches for the PSS signal carrying an intra-group identity $N_{ID}^{(2)}$ of the target cell. After receiving the SS/PBCH block, the SS/PBCH block can be saved locally in the distributed antenna system. Because the SS/PBCH block occupies fixed time-frequency domain resources, a position of a SSS signal can be determined after the PSS signal is searched.

At step 303, the distributed antenna system decodes the SSS signal in the SS/PBCH block and obtains a group identity $N_{ID}^{(1)}$ of the target cell. In this step, the distributed antenna system determines the $N_{ID}^{(1)}$ by means of blind decoding.

At step 304, the distributed antenna system calculates the cell identity $N_{ID}^{Cell}$ of the target cell according to the intra-group identity $N_{ID}^{(2)}$ and the group identity $N_{ID}^{(1)}$. The cell identity $N_{ID}^{Cell}$, i.e., the PCI, can be calculated according to Formula (1).

At step 305, the distributed antenna system decodes a PBCH DM-RS signal in the SS/PBCH block according to the cell identification $N_{ID}^{Cell}$. After the distributed antenna system obtains the $N_{ID}^{Cell}$ a frequency domain position of DM-RS of PBCH on the SS/PBCH block is determined according to Formula (2).

At step 306, the distributed antenna system determines the index of the SS/PBCH block according to the decoded PBCH DM-RS signal. After determining the frequency domain position of DM-RS of PBCH on the SS/PBCH block, all or part of information of the index $i_{SSB}$ of the SS/PBCH block can be determined by blind decoding. The blind decoding includes: firstly, all possible PBCH DM-RS signals are generated according to the $N_{ID}^{Cell}$. Taking the frequency band of 3.5 GHz as an example, there are 8 possible PBCH DM-RS signals, corresponding to the indexes of 8 SS/PBCH blocks that may occur in the SS/PBCH. Then, the PBCH DM-RS signals generated are cross-correlated with the PBCH DM-RS part of the SS/PBCH block received in order, to obtain all or part of information of the index of the SS/PBCH block.

In the case of subcarrier interval of 15 kHz or 30 kHz: for $L_{max}=4$, complete index $i_{SSB}$ (2 bit) information of the SS/PBCH block can be obtained through the above process, and then the starting position of the radio frame can be determined. For $L_{max}=8$, complete index $i_{SSB}$ (3 bit) information of the SS/PBCH block can be obtained through the above process, and then the starting position of the radio frame can be determined.

In the case of the sub-carrier interval of 120 kHz or 240 kHz, $L_{max}=64$, and information of three lowest bits of the index $i_{SSB}$ of the SS/PBCH block can be obtained through the above process. In order to obtain information of three highest bits of the index $i_{SSB}$ of the SS/PBCH block, the PBCH in the SS/PBCH block can be decoded to obtain the information of the three lowest bit of the index $i_{SSB}$ of the SS/PBCH block. Specifically, the distributed antenna system uses the PBCH DM-RS signal to perform channel estimation and decode PBCH to obtain main information block (MIB) information after the information of the three highest bits of the index $i_{SSB}$ of the SS/PBCH block are obtained from the PBCH DM-RS signal. The main information block (MIB) information contains the information of the three highest bits of the index of the SS/PBCH block.

Since 3GPP TS 38.213 defines the candidate position of the SS/PBCH block, the index of the SS/PBCH block indicates which candidate position the SS/PBCH block is located. Therefore, for each case of the candidate SS/PBCH block, the starting position of the radio frame can be located according to the position of the first OFDM symbol of the SS/PBCH block in the radio frame:

For the mode A: when the subcarrier interval of the SS/PBCH block is 15 kHz, for the carrier frequency less than or equal to 3 GHz, the first OFDM symbol of the candidate SS/PBCH block is located on the {2, 8, 16, 22} OFDM symbol of the radio frame, corresponding to the index {0, 1, 2, 3} of the SS/PBCH block respectively. For the carrier frequency greater than 3 GHz but less than or equal to 6 GHz, the first OFDM symbol of the candidate SS/PBCH block is located on the {2, 8, 16, 22, 30, 36, 44, 50} OFDM symbol of the radio frame, corresponding to the index {0, 1, 2, 3, 4, 5, 6, 7} of the SS/PBCH block respectively.

For the mode B: when the subcarrier interval of the SS/PBCH block is 30 kHz, for the carrier frequency less than or equal to 3 GHz, the first OFDM symbol of the candidate SS/PBCH block is located on the {4, 8, 16, 20} OFDM symbol of the radio frame, corresponding to the index {0, 1, 2, 3} of the SS/PBCH block respectively. For the carrier frequency greater than 3 GHz but less than or equal to 6 GHz, the first OFDM symbol of the candidate SS/PBCH block is located on the {4, 8, 16, 20, 32, 36, 44, 48} OFDM symbol of the radio frame, corresponding to the index {0, 1, 2, 3, 4, 5, 6, 7} of the SS/PBCH block respectively.

For the mode C: when the subcarrier interval of the SS/PBCH block is 30 kHz, for the carrier frequency less than or equal to 3 GHz, the first OFDM symbol of the candidate SS/PBCH block is located on the {2, 8, 16, 22} OFDM symbol of the radio frame, corresponding to the index {0, 1, 2, 3} of the SS/PBCH block respectively. For the carrier frequency greater than 3 GHz but less than or equal to 6 GHz, the first OFDM symbol of the candidate SS/PBCH block is located on the {2, 8, 16, 22, 30, 36, 44, 50} OFDM symbol of the radio frame, corresponding to the index {0, 1, 2, 3, 4, 5, 6, 7} of the SS/PBCH block respectively.

For the mode D: when the subcarrier interval of the SS/PBCH block is 120 kHz, for the carrier frequency greater than 6 GHz, the first OFDM symbol of the candidate SS/PBCH block is located on the {4, 8, 16, 20, 32, 36, 44, 48, 60, 64, 72, 76, 88, 92, 100, 104, 144, 148, 156, 160, 172, 176, 184, 188, 200, 204, 212, 216, 228, 232, 240, 244, 284, 288, 296, 300, 312, 316, 324, 328, 340, 344, 352, 356, 368, 372, 380, 384, 424, 428, 436, 440, 452, 456, 464, 468, 480, 484, 492, 496, 508, 512, 520, 524} OFDM symbol of the radio frame, corresponding to the index {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 49, 50, 51, 52, 53, 54, 55, 56, 57, 58, 59, 60, 61, 62, 63} of the SS/PBCH block respectively.

For the mode E: when the subcarrier interval of the SS/PBCH block is 240 kHz, for the carrier frequency greater than 6 GHz, the first OFDM symbol of the candidate SS/PBCH block is located on the {8, 12, 16, 20, 32, 36, 40, 44, 64, 68, 72, 76, 88, 92, 96, 100, 120, 124, 128, 132, 144, 148, 152, 156, 176, 180, 184, 188, 200, 204, 208, 212, 288, 292, 296, 300, 312, 316, 320, 324, 344, 348, 352, 356, 368, 372, 376, 380, 400, 404, 408, 412, 424, 428, 432, 436, 456, 460, 464, 468, 480, 484, 488, 492} OFDM symbol of the radio frame, corresponding to the index {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 49, 50, 51, 52, 53, 54, 55, 56, 57, 58, 59, 60, 61, 62, 63} of the SS/PBCH block respectively.

For the process of cell search and downlink synchronization of the UE, at least System Information Block Type1 (SIB1) needs to be decoded to complete the synchronization between the UE and the cell. In the embodiment, when the subcarrier interval is configured as 15 kHz or 30 kHz, the distributed antenna system can determine the starting position of the radio frame through steps 301 to 306 above.

When the subcarrier interval is configured as 120 kHz or 240 kHz, the distributed antenna system can decode the main information block (MIB) information in PBCH through steps S301 to S306 above to determine the starting position of the radio frame. Therefore, the distributed antenna system does not continue to decode the SIB1.

In an embodiment, the performing time division duplex synchronization according to the starting position of the radio frame and the preset uplink and downlink configuration of the radio frame includes: at the beginning of a next half-frame period of the wireless frame, performing switching between uplink and downlink, according to the preset uplink and downlink configuration of the radio frame.

In a time division duplexing (TDD) mode, a whole radio frame is divided into a downlink time slot, a protection interval and an uplink time slot. The uplink and downlink configuration of the radio frame includes parameters such as a TDD switching period, a downlink time slot length, a protection time interval length and an uplink time slot length. Based on these parameters, the distributed antenna system can accurately identify the uplink time slot and the downlink time slot and achieve the time division duplex synchronization.

The above preset uplink and downlink configuration of the radio frame can be manually set from a parameter interface of the distributed antenna system, and the distributed antenna system can automatically achieve the time division duplex synchronization by inserting these parameters from the parameter interface. In some application scenarios, to avoid uplink and downlink interference, the TDD switching period, the downlink time slot length, the protection interval length, and the uplink time slot length are fixed. For example, in the 2.6 GHz frequency band, China Mobile adopts the same configuration of 5 ms switching period and downlink and uplink length rate which is 3:1 as LTE TDD, in order to realize a coexistence of 5G NR and LTE TDD. In these scenarios, the distributed antenna system can set these parameters to default values, which do not need to be configured by users.

In the embodiment, a device for time division duplex synchronization for the distributed antenna system is further provided, which is used to realize the above embodiments and preferred embodiments. The previous description will not be repeated. As used below, the terms "module", "unit", etc., fulfill a combination of software and/or hardware capable of performing a predetermined function. Although the device described in the following embodiments is preferably implemented in software, implementation of hardware, or a combination of software and hardware, is also possible and envisaged.

Figure 5:
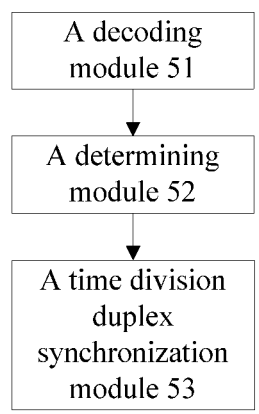
FIG. 5 is a schematic block diagram of a device for time division duplex synchronization for a distributed antenna system in an embodiment of the present disclosure.

FIG. 5 is a schematic block diagram of a device for time division duplex synchronization for a distributed antenna system in an embodiment of the present disclosure. As shown in FIG. 5, the device includes: a decoding module 51 coupled to a determination module 52, and configured for decoding a SS/PBCH block from a time division duplex cell, and obtaining an index of the SS/PBCH block; a determining module 52 coupled to a time division duplex synchronization module 53, and configured for determining, according to the index of the SS/PBCH block, a starting position of a radio frame in which the SS/PBCH block is located; and a time division duplex synchronization module 53 configured for performing time division duplex synchronization according to the starting position of the radio frame and a preset uplink and downlink configuration of the radio frame.

In an embodiment, the decoding module 51 is configured for decoding the SS/PBCH block through a cell search and a downlink synchronization process.

In an embodiment, the decoding module 51 includes a searching unit configured for selecting a target cell by searching a PSS signal; a receiving unit configured for receiving, upon searching for a PSS signal carrying an intra-group identification $N_{ID}^{(2)}$ of the target cell, the SS/PBCH block from the target cell; a first decoding unit configured for decoding a SSS signal in the SS/PBCH block, and obtaining a group identification $N_{ID}^{(1)}$ of the target cell; a calculating unit configured for calculating a cell identification $N_{ID}^{Cell}$ of the target cell according to the intra-group identification $N_{ID}^{(2)}$ and the group identification NID(1); a second decoding unit configured for decoding a PBCH DM-RS signal in the SS/PBCH block according to the cell identification $N_{ID}^{Cell}$; and a determining unit configured for determining the index of the SS/PBCH block according to the decoded PBCH DM-RS signal In an embodiment, the determining unit is configured for determining information of three lowest bits of the index of the SS/PBCH block according to the decoded PBCH DM-RS signal, channel estimating by using the PBCH DM-RS signal, and decoding a PBCH and obtaining information in a main information block, and the information in the master information block including information of three highest bits of the index of the SS/PBCH block In an embodiment, the determining module 52 includes: a first determining module configured for determining a mode of the SS/PBCH block according to a subcarrier interval of the SS/PBCH block and a frequency band of the SS/PBCH block, and a second determining module configured for determining, according to the index of the SS/PBCH block and the mode of the SS/PBCH block, the starting position of the radio frame in which the SS/PBCH block is located.

In an embodiment, the second determining module is configured for determining, according to the index of the SS/PBCH block and the mode of the SS/PBCH block, a position of a first OFDM symbol of the SS/PBCH block in the radio frame, and locating the starting position of the radio frame according to the position of the first OFDM symbol of the SS/PBCH block in the radio frame.

Since 3GPP TS 38.213 defines the candidate position of the SS/PBCH block, the index of the SS/PBCH block indicates which candidate position the SS/PBCH block is located. Therefore, for each case of the candidate SS/PBCH block, the starting position of the radio frame can be located according to the position of the first OFDM symbol of the SS/PBCH block in the radio frame:

For the mode A: when the subcarrier interval of the SS/PBCH block is 15 kHz, for the carrier frequency less than or equal to 3 GHz, the first OFDM symbol of the candidate SS/PBCH block is located on the {2, 8, 16, 22} OFDM symbol of the radio frame, corresponding to the index {0, 1, 2, 3} of the SS/PBCH block respectively. For the carrier frequency greater than 3 GHz but less than or equal to 6 GHz, the first OFDM symbol of the candidate SS/PBCH block is located on the {2, 8, 16, 22, 30, 36, 44, 50} OFDM symbol of the radio frame, corresponding to the index {0, 1, 2, 3, 4, 5, 6, 7} of the SS/PBCH block respectively.

For the mode B: when the subcarrier interval of the SS/PBCH block is 30 kHz, for the carrier frequency less than or equal to 3 GHz, the first OFDM symbol of the candidate SS/PBCH block is located on the {4, 8, 16, 20} OFDM symbol of the radio frame, corresponding to the index {0, 1, 2, 3} of the SS/PBCH block respectively. For the carrier frequency greater than 3 GHz but less than or equal to 6 GHz, the first OFDM symbol of the candidate SS/PBCH block is located on the {4, 8, 16, 20, 32, 36, 44, 48} OFDM symbol of the radio frame, corresponding to the index {0, 1, 2, 3, 4, 5, 6, 7} of the SS/PBCH block respectively.

For the mode C: when the subcarrier interval of the SS/PBCH block is 30 kHz, for the carrier frequency less than or equal to 3 GHz, the first OFDM symbol of the candidate SS/PBCH block is located on the {2, 8, 16, 22} OFDM symbol of the radio frame, corresponding to the index {0, 1, 2, 3} of the SS/PBCH block respectively. For the carrier frequency greater than 3 GHz but less than or equal to 6 GHz, the first OFDM symbol of the candidate SS/PBCH block is located on the {2, 8, 16, 22, 30, 36, 44, 50} OFDM symbol of the radio frame, corresponding to the index {0, 1, 2, 3, 4, 5, 6, 7} of the SS/PBCH block respectively.

For the mode D: when the subcarrier interval of the SS/PBCH block is 120 kHz, for the carrier frequency greater than 6 GHz, the first OFDM symbol of the candidate SS/PBCH block is located on the {4, 8, 16, 20, 32, 36, 44, 48, 60, 64, 72, 76, 88, 92, 100, 104, 144, 148, 156, 160, 172, 176, 184, 188, 200, 204, 212, 216, 228, 232, 240, 244, 284, 288, 296, 300, 312, 316, 324, 328, 340, 344, 352, 356, 368, 372, 380, 384, 424, 428, 436, 440, 452, 456, 464, 468, 480, 484, 492, 496, 508, 512, 520, 524} OFDM symbol of the radio frame, corresponding to the index {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 49, 50, 51, 52, 53, 54, 55, 56, 57, 58, 59, 60, 61, 62, 63} of the SS/PBCH block respectively.

For the mode E: when the subcarrier interval of the SS/PBCH block is 240 kHz, for the carrier frequency greater than 6 GHz, the first OFDM symbol of the candidate SS/PBCH block is located on the {8, 12, 16, 20, 32, 36, 40, 44, 64, 68, 72, 76, 88, 92, 96, 100, 120, 124, 128, 132, 144, 148, 152, 156, 176, 180, 184, 188, 200, 204, 208, 212, 288, 292, 296, 300, 312, 316, 320, 324, 344, 348, 352, 356, 368, 372, 376, 380, 400, 404, 408, 412, 424, 428, 432, 436, 456, 460, 464, 468, 480, 484, 488, 492} OFDM symbol of the radio frame, corresponding to the index {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 49, 50, 51, 52, 53, 54, 55, 56, 57, 58, 59, 60, 61, 62, 63} of the SS/PBCH block respectively.

In an embodiment, the time division duplex synchronization module 53 is configured for performing switching between uplink and downlink, according to the preset uplink and downlink configuration of the radio frame, with the starting position of the radio frame as a starting time.

Figure 6:
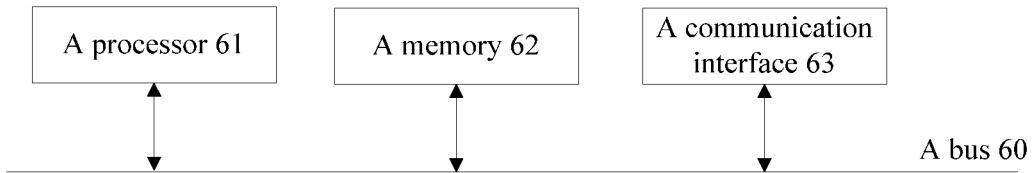
FIG. 6 is a hardware schematic diagram of an apparatus for time division duplex synchronization for a distributed antenna system in an embodiment of the present disclosure.

In addition, the method for time division duplex synchronization for the distributed antenna system in the embodiment of the present disclosure described in FIG. 1 can be realized by an apparatus for time division duplex synchronization for the distributed antenna system. FIG. 6 shows a hardware schematic diagram of an apparatus for time division duplex synchronization device for a distributed antenna system in an embodiment of the present disclosure.

The apparatus for time division duplex synchronization for the distributed antenna system may include a processor 61 and a memory 62 that stores computer program instructions.

Specifically, the processor 61 may include a central processing unit (CPU), or an Application Specific Integrated Circuit (ASIC), or one or more integrated circuits that may be configured to implement the embodiment of the present disclosure.

The memory 62 may include large storage for data or instructions. For example, rather than limiting, the memory 62 may include a Hard Disk Drive (HDD), a floppy disk drive, a flash memory, an optical disk, a magnetic disk, a magnetic tape, or a Universal Serial Bus (USB) drive or a combination of two or more of these. In an appropriate case, the memory 62 may include removable or non-removable (or fixed) media. In an appropriate case, the memory 62 may be inside or outside a data processing device. In a particular embodiment, the memory 62 is a non-volatile solid state memory. In a particular embodiment, the memory 62 includes a read-only memory (ROM). In an appropriate case, the ROM may be a mask-programmed ROM, a programmable ROM (PROM), an erasable PROM (EPROM), an electrically erasable PROM (EEPROM), an electrically rewritable ROM (EAROM) or a flash memory, or a combination of two or more of these.

The processor 61 may read and execute the computer program instructions stored in the memory 62 to realize the method for time division duplex synchronization for the distributed antenna system in any of the above embodiments.

In an embodiment, the apparatus for time division duplex synchronization for the distributed antenna system may further include a communication interface 63 and a bus 60. As shown in FIG. 6, the processor 61, the memory 62 and the communication interface 63 are connected and communicate with each other through the bus 60.

The communication interface 63 is mainly configured for realizing communications between modules, devices, units and/or apparatuses in the embodiment of the present disclosure.

The bus 60 includes hardware, software, or both, which decouple components of the apparatus for time division duplex synchronization for the distributed antenna system to each other. For example, rather than limiting, the bus may include an accelerated graphics port (AGP), or other graphical bus, an enhance industry standard architecture (EISA) bus, a Front Side Bus (FSB), a Hyper Transport (HT) interconnection, an industry standard architecture (ISA) bus, an unlimited bandwidth interconnect, a low pin count (LPC) bus, a memory bus, a micro channel architecture (MCA) bus, a peripheral component interconnect (PCI) bus, a PCI-Express (PCI-X) bus, a Serial Advanced Technology Accessory (SATA) bus, a Video Electronics Standards Association Local Bus (VLB) or other appropriate bus or a combination of two or more of these. In an appropriate case, the bus 60 may include one or more buses. Although specific buses are described and shown in the embodiment of the present disclosure, the present disclosure considers any suitable bus or interconnection.

The device for time division duplex synchronization for the distributed antenna system can execute the method for time division duplex synchronization for the distributed antenna system in the embodiment of the present disclosure based on the SS/PBCH block obtained, so as to realize the method for time division duplex synchronization for the distributed antenna system described in FIG. 1.

In addition, in combination with the method for time division duplex synchronization for the distributed antenna system in the above embodiments, the embodiment of the present disclosure may provide a computer-readable storage medium for realization. The computer-readable storage medium stores computer program instructions, and the computer program instructions are executed by the processor to implement the method for time division duplex synchronization for the distributed antenna system in any of the above embodiments.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a plurality of variations and modifications may be made by those skilled in the art without departing from the spirit and scope of the disclosure. Therefore, the scope of the disclosure should be determined by the appended claims.

We claim:

1. A method for time division duplex synchronization for a distributed antenna system, comprising:
decoding a Synchronization Signal/Physical Broadcast Channel (SS/PBCH) block from a time division duplex cell, and obtaining an index of the SS/PBCH block;
determining, according to the index of the SS/PBCH block, a starting position of a radio frame in which the SS/PBCH block is located; and performing time division duplex synchronization according to the starting position of the radio frame and a preset uplink and downlink configuration of the radio frame; wherein the determining, according to the index of the SS/PBCH block, the starting position of the radio frame in which the SS/PBCH block is located comprises: determining a mode of the SS/PBCH block according to a subcarrier interval of the SS/PBCH block and a frequency band of the SS/PBCH block, and thereby determining the starting position of the radio frame in which the SS/PBCH block is located; wherein the decoding the SS/PBCH block from the time division duplex cell comprises: decoding the SS/PBCH block through a cell search and a downlink synchronization process; the decoding the SS/PBCH block through the cell search and the downlink synchronization process comprises: selecting a target cell by searching a Primary Synchronization signal (PSS); receiving, upon searching for a PSS signal carrying an intra-group identification $N_{ID}^{(2)}$ of the target cell, the SS/PBCH block from the target cell; decoding a Secondary Synchronization signal (SSS) in the SS/PBCH block, and obtaining a group identification $N_{ID}^{(1)}$ of the target cell, wherein N represents a variable; calculating a cell identification $N_{ID}^{Cell}$ of the target cell according to the intra-group identification $N_{ID}^{(2)}$ and the group identification $N_{ID}^{(1)}$; decoding a PBCH DM-RS signal in the SS/PBCH block according to the cell identification $N_{ID}^{Cell}$; and determining the index of the SS/PBCH block according to the decoded PBCH DM-RS signal; the determining, according to the index of the SS/PBCH block and the mode of the SS/PBCH block, the starting position of the radio frame in which the SS/PBCH block is located further comprises: determining, according to the index of the SS/PBCH block and the mode of the SS/PBCH block, a position of a first OFDM symbol of the SS/PBCH block in the radio frame, and thereby locating the starting position of the radio frame.

2. The method of claim 1, wherein the determining the index of the SS/PBCH block according to the decoded PBCH DM-RS signal comprises:
determining information of three lowest bits of the index of the SS/PBCH block according to the decoded PBCH DM-RS signal; and
channel estimating by using the PBCH DM-RS signal, decoding a PBCH and obtaining information in a main information block, wherein the information in the master information block includes information of three highest bits of the index of the SS/PBCH block.

3. The method of claim 1, wherein the subcarrier interval of the SS/PBCH block comprises one of the following: 15kHz, 30kHz, 120kHz and 240kHz.

4. The method of claim 1, wherein the performing time division duplex synchronization according to the starting position of the radio frame and the preset uplink and downlink configuration of the radio frame comprises:
performing switching between uplink and downlink, according to the preset uplink and downlink configuration of the radio frame, with the starting position of the radio frame as a starting time.

5. A device for time division duplex synchronization for a distributed antenna system, comprising: means for decoding a Synchronization Signal/Physical Broadcast Channel (SS/PBCH) from a time division duplex cell, and obtaining an index of the SS/PBCH block; means for determining, according to the index of the SS/PBCH block, a starting position of a radio frame in which the SS/PBCH block is located; and means for performing time division duplex synchronization according to the starting position of the radio frame and a preset uplink and downlink configuration of the radio frame; wherein the determining the starting position comprises: determining a mode of the SS/PBCH block according to a subcarrier interval of the SS/PBCH block and a frequency band of the SS/PBCH block; and determining, according to the index of the SS/PBCH block and the mode of the SS/PBCH block, the starting position of the radio frame in which the SS/PBCH block is located; wherein the decoding the SS/PBCH block from the time division duplex cell comprises: decoding the SS/PBCH block through a cell search and a downlink synchronization process; the decoding the SS/PBCH block through the cell search and the downlink synchronization process comprises: selecting a target cell by searching a Primary Synchronization signal (PSS); receiving, upon searching for a PSS signal carrying an intra-group identification $N_{ID}^{(2)}$ the target cell, the SS/PBCH block from the target cell; Secondary Synchronization signal (SSS) in the SS/PBCH block, and obtaining a group identification $N_{ID}^{(1)}$ of the target cell, wherein N represents a variable; calculating a cell identification $N_{ID}^{Cell}$ of the target cell according to the intra-group identification $N_{ID}^{(2)}$ and the group identification $N_{ID}^{(1)}$ decoding a PBCH DM-RS signal in the SS/PBCH block according to the cell identification $N_{ID}^{Cell}$: and determining the index of the SS/PBCH block according to the decoded PBCH DM-RS signal; the determining, according to the index of the SS/PBCH block and the mode of the SS/PBCH block, the starting position of the radio frame in which the SS/PBCH block is located further comprises: determining, according to the index of the SS/PBCH block and the mode of the SS/PBCH block, a position of a first OFDM symbol of the SS/PBCH block in the radio frame, and thereby locating the starting position of the radio frame.

6. An apparatus for time division duplex synchronization for a distributed antenna system, comprising: at least a processor, at least a memory and computer program instructions stored in the memory, the computer program instructions being executed by the processor to implement a method for time division duplex synchronization for a distributed antenna system, comprising: decoding a Synchronization Signal/Physical Broadcast Channel (SS/PBCH) from a time division duplex cell, and obtaining an index of the SS/PBCH block; determining, according to the index of the SS/PBCH block, a starting position of a radio frame in which the SS/PBCH block is located; and performing time division duplex synchronization according to the starting position of the radio frame and a preset uplink and downlink configuration of the radio frame; wherein the determining, according to the index of the SS/PBCH block, the starting position of the radio frame in which the SS/PBCH block is located comprises: determining a mode of the SS/PBCH block according to a subcarrier interval of the SS/PBCH block and a frequency band of the SS/PBCH block, and thereby determining the starting position of the radio frame in which the SS/PBCH block is located; wherein the decoding the SS/PBCH block from the time division duplex cell comprises: decoding the SS/PBCH block through a cell search and a downlink synchronization process; the decoding the SS/PBCH block through the cell search and the downlink synchronization process comprises: selecting a target cell by searching a Primary Synchronization signal (PSS); receiving, upon searching for a PSS signal carrying an intra-group identification $N_{ID}^{(2)}$ of the target cell, the SS/PBCH block from the target cell; decoding a Secondary Synchronization signal (SSS) in the SS/PBCH block, and obtaining a group identification $N_{ID}^{(1)}$ of the target cell, wherein N represents a variable; calculating a cell identification $N_{ID}^{Cell}$ of the target cell according to the intra-group identification $N_{ID}^{(2)}$ the group identification $N_{ID}^{(1)}$ decoding a PBCH DM-RS signal in the SS/PBCH block according to the cell identification $N_{ID}^{Cell}$: and determining the index of the SS/PBCH block according to the decoded PBCH DM-RS signal; the determining, according to the index of the SS/PBCH block and the mode of the SS/PBCH block, the starting position of the radio frame in which the SS/PBCH block is located further comprises: determining, according to the index of the SS/PBCH block and the mode of the SS/PBCH block, a position of a first OFDM symbol of the SS/PBCH block in the radio frame, and thereby locating the starting position of the radio frame.

7. A computer-readable storage medium having stored computer program instructions, wherein the computer program instructions are executed by a processor to implement the method of claim 1.

8. The computer-readable storage medium of claim 7, wherein the determining the index of the SS/PBCH block according to the decoded PBCH DM-RS signal comprises:
determining information of three lowest bits of the index of the SS/PBCH block according to the decoded PBCH DM-RS signal; and
channel estimating by using the PBCH DM-RS signal, decoding a PBCH and obtaining information in a main information block, wherein the information in the master information block includes information of three highest bits of the index of the SS/PBCH block.

9. The apparatus of claim 6, wherein the determining the index of the SS/PBCH block according to the decoded PBCH DM-RS signal comprises:

determining information of three lowest bits of the index of the SS/PBCH block according to the decoded PBCH DM-RS signal; and channel estimating by using the PBCH DM-RS signal, decoding a PBCH and obtaining information in a main information block, wherein the information in the master information block includes information of three highest bits of the index of the SS/PBCH block.

10. The apparatus of claim 6, wherein the subcarrier interval of the SS/PBCH block comprises one of the following: 15kHz, 30kHz, 120kHz and 240kHz.

11. The apparatus of claim 6, wherein the performing time division duplex synchronization according to the starting position of the radio frame and the preset uplink and downlink configuration of the radio frame comprises:

performing switching between uplink and downlink, according to the preset uplink and downlink configuration of the radio frame, with the starting position of the radio frame as a starting time.

* * * * *